United States Patent Office 2,877,099
Patented Mar. 10, 1959

2,877,099

MULTISTAGE CONCURRENT-COUNTERCURRENT LIQUID GAS CONTACT AND APPARATUS THEREFOR

Vernon O. Bowles, Rye, N. Y., assignor to Socony Mobil Oil Company, a corporation of New York Application August 15, 1956, Serial No. 604,216

7 Claims. (Cl. 23—288)

The present invention relates to liquid-gas contact in the presence of a particulate solid and, more particularly, to liquid-gas contact wherein the primary flow of both liquid and gas is countercurrently through the system although the secondary flow of said liquid and said gas flow is concurrently upward in each stage. The present invention is especially concerned with hydrocarbon conversion at elevated temperatures and at pressures from atmospheric to 100 or more atmospheres in which the hydrocarbon or a mixture of hydrocarbons is contacted with a gas, for example, hydrogen, in the presence of a particulate solid catalyst. Illustrative of the present invention as a hydrocarbon conversion is the hydrodesulfurization of a hydrocarbon oil under a pressure such that a portion of the hydrocarbon oil is in the liquid phase in the presence of flowing hydrogen-containing gas.

In general, the present invention provides a means for treating a liquid with a gas in the presence of a particulate solid. The liquid can be an absorbent or solvent for one or more of the components of the gas and the particulate solid can be material which is inert in the process and merely acts as a spreader to increase the time and efficiency of contact. Such particulate solid material, inert in the process, can be, for example, Berle saddles, coke, pumice, etc. The liquid can be a material undergoing a chemical reaction with the gas in the presence of a particulate solid inert in the process where the reaction is diffusion limited and a finite amount of time is required to obtain practical reaction. The liquid can be a material undergoing a chemical reaction with the gas in the presence of a particulate solid which is a catalyst for the reaction. Illustrative of the latter are hydrogenation of hydrocarbon oils, hydrodesulfurization of hydrocarbon oils, and hydrocracking of hydrocarbon oils in all of which a hydrocarbon oil is treated with a hydrogen-containing gas in the presence of a catalyst.

Figure 1:
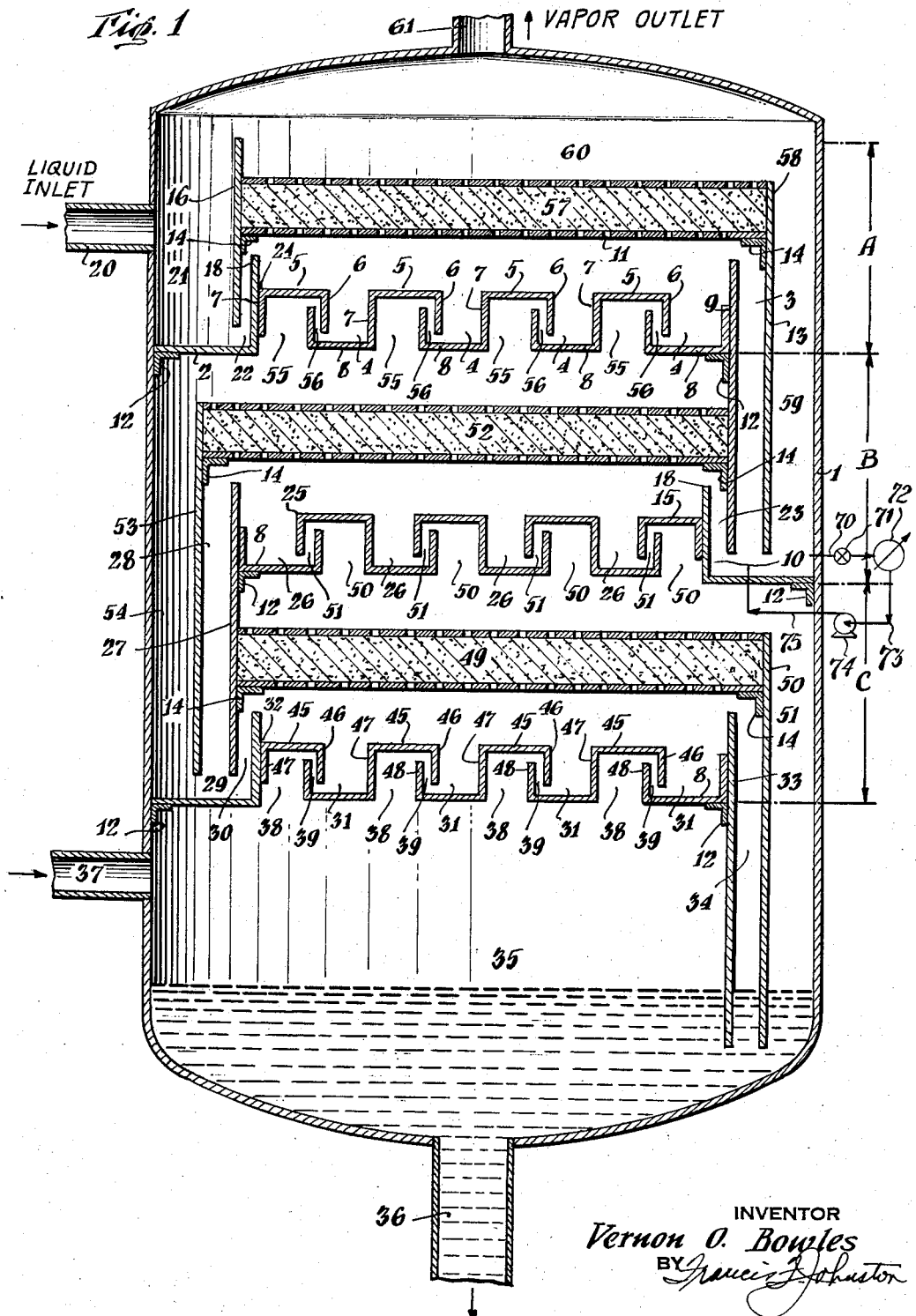

The present invention also provides for regulation of the temperature in one or more of the reaction zones. Thus, provision is made to withdraw liquid undergonig reaction from one or more of the reaction or contact zones, to heat exchange the withdrawn liquid with a heat transfer medium and to return the heat exchanged liquid to the same or another downstream reaction zone. Accordingly, one or more of the reaction or contact zones other than the first zone is provided with an outlet through which liquid to be further treated is withdrawn, brought into heat exchange with a heat transfer medium external of the reaction zone, and returned downstream for further treatment. When the reaction is exothermic, excess heat in the liquid being treated is removed by cooling. When the reaction is endothermic, the liquid is heated. Thus, for example, as illustrated in Figure 1, liquid hydrocarbon having been heated in reaction zone A flows through line 70 under control of valve 71 to heat exchanger 72. From heat exchanger 72 the liquid hydrocarbon flows through line 73 to the suction side of pump 74. Pump 74 discharges the heat exchanged liquid hydrocarbon into line 75 through which it returns to the pool of liquid hydrocarbon entering into reaction zone B. While cooling is indicated in heat exchanger 72, the liquid hydrocarbon can be heated instead of cooled in heat exchanger 72.

More particularly, the present invention provides a means for treating a hydrocarbon oil with a gas wherein a liquid hydrocarbon is treated successively in a plurality of zones which are in liquid and gaseous communication for countercurrent flow of liquid and gas and wherein a liquid hydrocarbon flows from a first reaction zone through at least one intermediate reaction zone to the last reaction zone while a gaseous medium flows from the last reaction zone through the aforesaid intermediate zones to the said first reaction zone. For reactions or extractions taking place at temperatures above ambient temperature the liquid reactant and/or the gaseous reactant are heated to reaction or process temperature. It may be necessary for some extractions or reactions to cool the liquid and/or the gas below ambient temperatures. The liquid reactant or extractant or solvent is introduced into the first extraction or reaction zone at a point which is vertically intermediate a gas-liquid contacting means and a static bed of particulate solid material inert in the process or entering into the process as a catalyst supported thereabove. The gas is introduced, preferably through a plurality of gas inlets into the last reaction zone of the series which comprises at least a first reaction zone, an intermediate reaction zone and a last reaction zone. These reaction zones each comprise a gas distributing means immersed in a pool of liquid, a froth zone, and a bed of particulate solid, the lower surface of which at least is in said froth zone. In many operations it will be advantageous to have a plurality of intermediate reaction zones. The gas passes upwardly successively through said last reaction zone, said intermediate reaction zones and said first reaction zone. The liquid passes downwardly successively through said first reaction zone, said intermediate reaction zones and said last reaction zone. Thus, the primary flow of liquid through the series of reaction zones is countercurrent to the primary flow of gas through said series of reaction zones, while the secondary flow of liquid and gas, i. e., the flow in each reaction zone, is concurrent. The gas and at least a portion of the liquid in each reaction zone flows upwardly. However, the flow of liquid and gas in the first reaction zone is regulated and controlled so that a major portion and preferably all of said liquid passes concurrently upward with said gas through said static bed of particulate solid in said first reaction zone while a minor portion, if any, may bypass said static bed of particulate solid. The liquid effluent from said bed of particulate solid is then mixed with the minor portion of liquid, if any, which may have bypassed said static bed of particulate solid to form a first intermediate feed. This first intermediate feed is introduced into a first intermediate reaction zone at a point vertically intermediate a static bed of particulate solid in said intermediate reaction zone and a gas inlet preferably a plurality of gas inlets in said intermediate reaction zone. Said gas is introduced into said intermediate reaction zone preferably through a plurality of inlets. The rate of flow of said intermediate feed and said gas in said intermediate reaction zone is regulated and controlled so that at least a major portion and preferably all of said intermediate feed and the gas flow concurrently upwardly through said static bed of particulate solid in said intermediate reaction zone. The sequence of mixing the effluent from the bed of particulate solid with the portion of the first intermediate feed, if any, which may have bypassed the bed of particulate solid in the first intermediate reaction zone, to form another intermediate feed, introducing said other intermediate feed into another intermediate reaction zone at a point vertically intermediate a static bed of particulate solid in said other intermediate reaction zone and a gas inlet, preferably a plurality of gas inlets, introducing a gas into said other intermediate reaction zone through said gas inlet(s), regulating and controlling the flow of said other intermediate feed and said gas in said other intermediate reaction zone so that at least a major portion and preferably all of said other intermediate feed and said gas flow concurrently upwardly through said other intermediate reaction zone, is repeated for each additional intermediate reaction zone. The effluent from the static bed of particulate solid in the last intermediate reaction zone is mixed with the minor portion of the last intermediate feed, if any, which may have bypassed the bed of particulate solid in the last intermediate reaction zone, to form a final intermediate feed. The final intermediate feed is introduced into the last reaction zone at a point vertically intermediate a static bed of particulate solid and a gas inlet, preferably a plurality of gas inlets. Gas is introduced into said last reaction zone through said gas inlet. The flow of said final intermediate feed and said gas is regulated so that at least a major portion and preferably all of said final intermediate feed and said gas flow concurrently through said static bed of particulate solid and the minor portion of said final intermediate feed, if any, which may have bypassed the static bed of particulate solid in the last reaction zone are mixed and withdrawn from the system. The gas is withdrawn from the first reaction zone and, when desirable or necessary, returned to the last reaction zone.

The aforedescribed primary countercurrent flow of liquid and gas with secondary concurrent flow of the liquid and gas can be obtained by providing each reaction or extraction zone with a gas distributing means such as the conventional bubble cap tray designed for side to side flow or side to center and center to side flow, a perforated plate or a "Uniflux" tray such as described in U. S. Patents Nos. 2,692,128; 2,699,929 and 2,714,504 and pending application Serial No. 519,839 filed July 5, 1955, and a superimposed bed of particulate solid vertically spaced above said fractionating tray so that at least the bottom of said bed of particulate solid is within the foam or froth band or zone which is present above conventional fractionating trays during operation. Any other gas-liquid mixing device which provides satisfactory mixing of the gas and liquid with sufficient entrapment of the liquid in the gas streams to ensure that at least a major portion of the liquid on the gas distributing means or mixing device will be entrapped in the upwardly flowing gas will provide satisfactory results.

A preferred form of a series of such extraction or reaction zones comprises an extractor or reactor, preferably of elongated cylindrical shape and of suitable material to be operative at pressures up to 2500 or more pounds per square inch gauge (p. s. i. g.) and temperatures up to 1200 degrees Fahrenheit. The extractor or reactor is provided with a plurality of extraction or reaction zones comprising a gas-liquid mixing and distributing means providing a pool or plurality of pools of liquid through which the gas passes upwardly, such as a fractionating tray, for example, a "Uniflux" tray, and a bed of particulate solid vertically spaced above said gas-liquid mixing and distributing means a distance such that at least the bottom of said bed of particulate solid is within the foam or froth zone of said mixing and distributing means, e. g., "Uniflux" tray so that a major portion, i. e., from about 55 to about 100 percent of the liquid on the mixing and distributing means is entrained in the gas and carried up into the bed of particulate solid. The mixing and distributing means is provided with weirs at the inlet and outlet. Each mixing and distributing means is provided with a downcomer by means of which the liquid in excess of that entrapped in the gas and carried up into the bed of particulate solid is delivered to the tray in the extraction or reaction zone which zone is next in series and immediately below. The bed of particulate solid is also provided with a downcomer which delivers the liquid from the top of the bed to the mixing and distributing means in the extraction or reaction zone which is next in series and immediately beneath.

When the liquid is substantially completely in the liquid phase at the temperature, pressure and gas flow rate existing in the extractor or reactor, the liquid is introduced into the extractor or reactor through one or more inlets vertically spaced above the level of the bottom of the mixing and distributing means in the first reaction zone.

When a feed which is mixed phase at the temperature, pressure and gas flow rate existing in the reactor is to be treated, the feed is introduced into the first reaction zone as described hereinbefore. Thereby the portion of the mixed phase feed which is in the vapor phase will bypass the bed of particulate solid in the first reaction zone and can be withdrawn through the vapor outlet and subsequently treated in the vapor phase in an auxiliary reactor. Alternatively, the vapor phase can be forced through the bed of particulate solid in the first reaction zone, withdrawn through the vapor outlet of the reactor and subsequently treated, if necessary and desirable, in an auxiliary reactor. In addition, when a feed which is mixed phase at temperature, pressure and gas flow rate existing in the reactor is to be treated, the feed can be separated into liquid and vapor portions. The liquid portion of the mixed phase feed is introduced into the first reaction zone as described hereinbefore and the vapor portion introduced into one or more of the lower reaction zones or the lowermost zone.

When the feed is close to the dew-point thereof, a portion may be vaporized in the reaction zone because of the reduction in partial pressure resulting from the presence of the treating gas, or because of an increase in temperature due to exothermic reaction or to absorption. As a consequence, the portion vaporized in the first reaction zone will not be treated in the lower reaction zones but only in the first reaction zone. Accordingly, subsequent treatment may be desirable. The liquid after flowing concurrently upward with the gas through the bed of particulate solid flows downwardly to the surface of the mixing and distributing means in the next lower extraction or reaction zone. The flow of liquid as aforedescribed is repeated in each successive lower extraction or reaction zone until the last or lowermost extraction or reaction zone is reached.

In the last or lowermost reaction zone the flow of liquid is concurrent with the flow of gas upwardly from the mixing and distributing means through the bed of particulate solid and thence to the liquid outlet.

The gas to be treated, i. e., from which one or more components is to be extracted, or the gas necessary to a reaction, e. g., hydrogen-containing gas for hydrodesulfurization, hydrocracking, hydrogenation, etc., is introduced into the extractor or reactor at one or more points below the level of the bottom of the mixing and distributing means in the last or lowermost reaction zone. The gas passes upwardly into the caps and then downwardly and again upwardly through the liquid on the distributing means. Dependent upon the rate of flow of the gas a froth or foam about 2 to about 18 inches in depth will form on the surface of the liquid on the mixing and distributing means.

The bed of particulate solid is vertically spaced from the mixing and distributing means a distance such that at least the bottom of the bed of particulate solid is within the froth zone. The gas with entrapped liquid rises up through the bed of particulate solid which is of such depth and particle size that the back pressure across the bed of particulate solid does not exceed the head of liquid available in the associated downcomers to move said liquid on to the appropriate mixing and distributing means therebelow or in to the bottom chamber—generally not more than about 25 pounds per square inch (25 p. s. i.) and presently preferably is in the range of 1 to 5 pounds per square inch.

Above the top of the bed of particulate solid, the gas, except for that dissolved in the liquid, usually a minor portion, separates from the liquid (which flows into the connecting downcomer passage) and flows upwardly to and through the mixing and distributing means of the extraction or reaction zone next immediately above. The flow of gas through each of the other extraction or reaction zones is as aforedescribed until the gas passes through the bed of the first or uppermost extraction or reaction zone in the extractor or reactor. Here the gas separates from the liquid above the bed and flows from the extractor or reactor.

Figure 2:
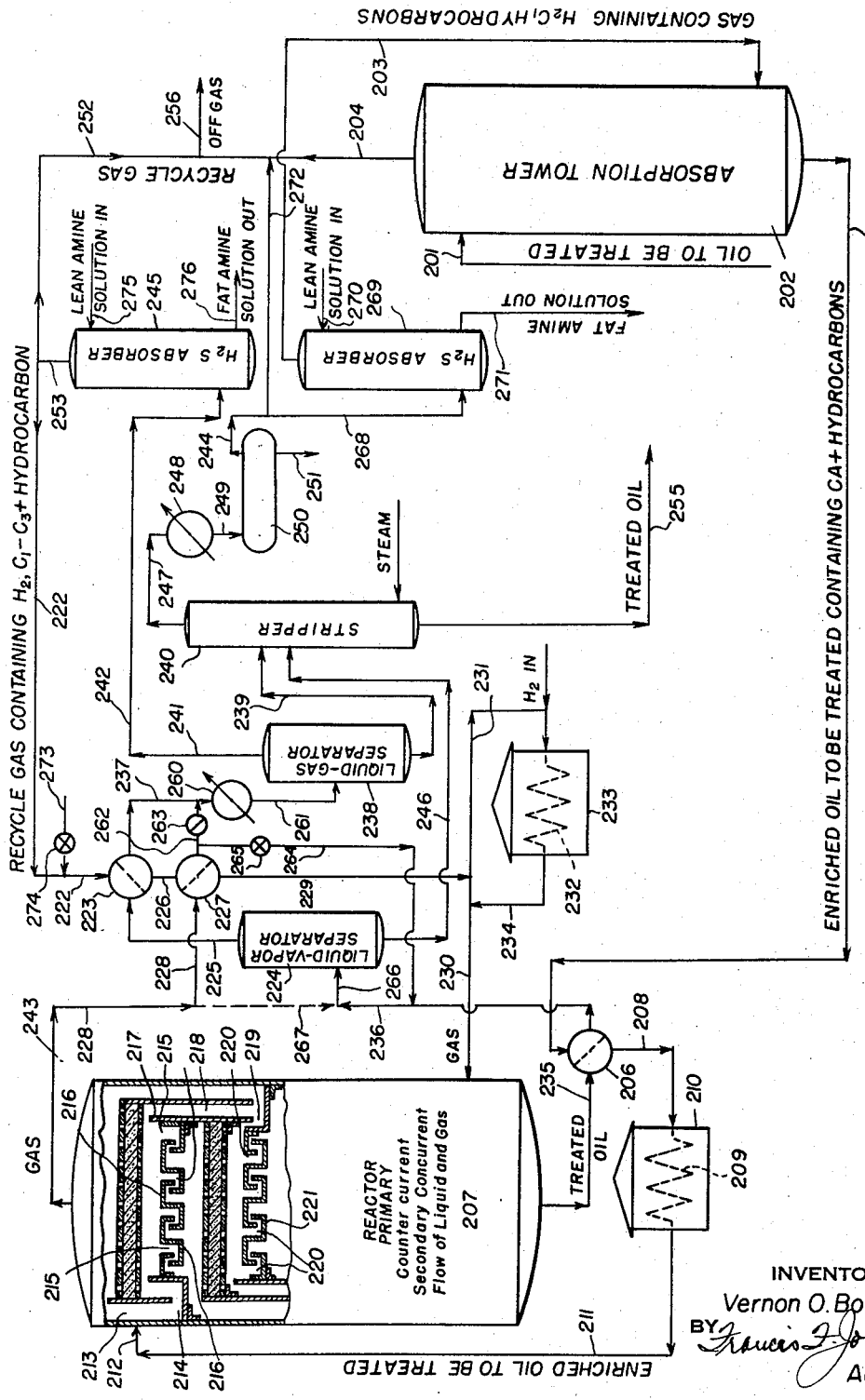

A preferred form of an extractor or a reactor for primary countercurrent flow of liquid and gas with secondary concurrent flow of liquid and gas is illustrated in the drawing Figure 1 while the integration of such a reactor in a refinery operation is illustrated in Figure 2.

Referring to Figure 1 which is a vertical section of an extractor or reactor, a shell 1, preferably of elongated cylindrical shape with elliptical ends, is provided with a plurality of extraction or reaction zones A, B and C. Each reaction (extraction) zone extends from the bottom of a gas-liquid mixing and distributing means to and including a gas disengaging zone and comprises a gas-liquid mixing and distributing means, a bed of particulate solid, a foam or froth zone intermediate said mixing and distributing means and said bed of particulate solid, and a gas disengaging zone above the upper surface of said bed of particulate solid. While an extractor or a reactor having three zones is illustrated, those skilled in the art will recognize that more or fewer zones can be used depending upon the exigencies of each operation.

The drawings illustrate the use of the "Uniflux" fractionating tray described in U. S. Patents Nos. 2,692,128; 2,699,929 and 2,714,504 and U. S. application Serial No. 519,839 (filed July 5, 1955) functioning as a gas-liquid mixing and distributing means. Broadly, this fractionating tray comprises a plurality of trough-like members which serve as structural beams extending transversely across the tower and a plurality of slotted elements affixed to either end of said members, adjacent members being interlocked one into the other by engagement of the slot edges of said elements affixed to either end of each member with the trough edge of an adjoining member.

A plurality of support angles 12 are welded or otherwise secured to the inside of shell 1. Resting upon and affixed to each support angle 12 are the members which make up the fractionating tray including the seal pans 2 having lips 18 welded or otherwise secured thereto. Adjacent to each group of horizontal trays are downcomers 3, 28 and 34 through which a portion (a minor portion and preferably none) of the liquid not entrapped in the gas flows to the mixing and distributing means of the next lower extraction or reaction zone. Each downcomer is sealed by the level of the liquid in the seal pan 2 below or in chamber 35, thus preventing the upward passage of vapor therethrough. The trays are composed of a series of troughs 4, 26 and 31 spaced at uniform intervals transversely across the extractor or reactor and positioned usually in co-planar relationship one with the other. The vertical walls of each of the troughs are usually positioned at substantially right angles to the respective trough bottoms.

To each trough is attached an L-shaped section composed of a horizontal leg 5, 15 and 45 attached to the downstream edge of the trough and a vertical leg 6, and 46, the lower edge of which is serrated. The aforementioned L-shaped section overhanging the upstream trough of each tray is attached to vertical trough wall 7 and 47 which, in turn, is affixed in any suitable manner to trough bottom plate 8 of the troughs 4, 26 and 31. The vertical trough walls 7 and 47 of the first upstream vapor sections are affixed in any suitable manner to the lip of the seal pans 2. The trough bottom plates 8 are supported by the support rings 12. The downstream wall of the trough terminating each tray section is affixed in any suitable manner to plates 9, 27 and 33. Plates 9, 27 and 33 are affixed to shell 1 in any suitable manner and extend vertically below the horizontal level of the uppermost edge of the lip 18 of seal pan 2 to a point sufficient to effect an adequate vapor and gas seal of the tray and permit the desired passage of liquid thereunder. This may be accomplished by extending plates 9, 27 and 33 downwardly to a point below horizontal leg 5, 15 and 45 or the top of the seal pan lips 18 which can extend above horizontal legs 5, 15, and 45 but above seal pan 2 of the next lower tray so that liquid can easily flow thereunder through passage 10 formed between the lower ends of plates 9, 27 and 33 and seal pans 2 but sufficiently below the level of horizontal legs 5, 15 and 45 or top seal pan lips 18 of said lower tray to provide vapor and gas seals.

It will be observed that plates 9 and 27 also form a side for the baskets within which the particulate solid is placed in the extraction or reaction zone below.

The particulate solid is supported on a perforated disk or other foraminous member 11 which in turn rests upon and is supported by angles 14 secured to the inner side of plates 13, 53 and 50 and to the inner side of plates 16, 9 and 27 and shell 1 in any suitable manner.

When used as a gas-liquid extraction tower the operation is as follows: Liquid enters the tower through liquid inlet 20. The liquid flows downwardly through passage 21 and upwardly through passage 22 and thence on to the distributing and mixing means, e. g., a fractionating tray 24. When the troughs 4 in fractionating tray 24 are filled with liquid, the vapors passing upwardly from below cause the liquid to froth and induce a major part of it to flow up into and through the packed section 57, this liquid disengaging thereabove and flowing over the edge of plate 58 and down through passage or downcomer 59, while the excess, if any, flows over the upper edge of plate 9 and down through passage or downcomer 3. When the level of liquid in passages 3 and 59 is such that the hydrostatic pressure thereof raises the liquid level in passage 23 above the level of horizontal portions of the L-shaped pieces of fractionating tray 25 or of the uppermost edge of the lip of the seal pan 18 the liquid flows through passages 10 and 23 on to tray 25. When the troughs 26 of tray 25 are filled, the vapors passing upwardly from below cause the liquid to froth and induce a major part of it to flow upwardly into and through packed section 52, the liquid disengaging thereabove and flowing over the edge of plate 53 and down through passage or downcomer 54, while excess liquid, if any, flows over the top of plate 27 and down through passage 28 to passage 29 where it joins the major portion from passage 54 and the combined liquid flows up through passage 30 to fill the troughs 31 of tray 32. When the troughs of tray 32 are filled with liquid, vapors passing upwardly from below cause the liquid to froth and induce a major part of it to flow upwardly into and through packed section 49, the liquid disengaging thereabove and flowing over the edge of plate 50 and down through passage or downcomer 51; the excess liquid, if any, flows over the top of plate 33 down through passage 34 and along with the major portion of the liquid from passage 51 flows into chamber 35 and thence through outlet 36 to means for separating the extracted components of the gas or during start-up to means for recycling the liquid to liquid inlet 20 or to such other intermediate points as may be expedient (through line 73, pump 74, and line 75, for instance).

The extraction tower having been charged with liquid absorbent or reactant, the gas to be treated is introduced into the tower through gas inlet 37. The gas enters chamber 35 and flows upwardly into the risers 38 formed by vertical sections 47 and 48 of the adjacent troughs of tray 32. From risers 38 the gas flows through passages 39 formed by serrated vertical portions 46 of the L-shaped portion of the troughs and vertical portions 48 of the adjacent troughs. From passages 39 the gas flows through the oil in troughs 31 with sufficient velocity to produce a froth or foam zone extending from the level of the liquid on tray 32 at least to the bottom of the bed 49 of particulate solid. The entrapped liquid in the gas stream is carried up through bed 49 against a back pressure which does not exceed the head of liquid available in the downcomer passages 28 and 54 required to cause the liquid to flow on to tray 32 (preferably in the range of 1–5 p. s. i. g.). The entrapped liquid rises with the gas through bed 49, disengages thereabove and flows over the top of plate 50 down through passage 51 to chamber 35 where it mixes with the liquid flowing thereinto, if any, from passage 34. The liquid leaves chamber 35 through liquid outlet 36.

The gas, rising with the liquid from the top of bed 49, disengages from the liquid thereabove and enters risers 50 of tray 25, leaves risers 50 via passages 51 and flows through the oil in troughs 26 of tray 25 to form a froth or foam zone extending at least to the bottom of bed 52 of particulate solid.

The entrapped oil rises with the gas through bed 52, disengages thereabove and flows over the top of plate 53 down through passage 54 to passage 29 to flow through passages 29 and 30 on to tray 32.

The gas rising with the liquid from bed 52 disengages from the liquid thereabove and enters into risers 55 of tray 24, flows through passage 56 into troughs 4 of tray 24 which are filled with oil of sufficient velocity to produce a froth or foam zone extending from the level of the liquid on tray 24 at least to the bottom of the bed 57 of particulate solid. The gas and the entrapped oil flow concurrently upwardly through bed 57. The oil disengages from the gas thereabove and flows off the top of bed 57 of particulate solid over the top of plate 58 and down through passage 59 to passage 10, thence upwardly through passage 23 onto tray 25.

The gas having disengaged from the liquid above bed 57 of particulate solid flows into chamber 60 and thence through gas outlet 61 to waste, re-use, further vapor phase treatment, etc.

It is to be observed that the gas flows through each of trays 32, 25 and 24 at a rate sufficient to produce a froth or foam of gas and liquid the upper portion of which envelops at least the bottom of the superposed bed 49, 52 and 57, respectively, of particulate solid. It is also to be observed that a major portion, preferably all of the liquid, enters each bed as a part of the aforesaid froth or foam and disengages from the gas above each bed (49, 52 and 57) and flows into the connecting passages or downcomers 59, 54 and 51. It is also to be observed that only a minor portion, less than about 25 percent, and preferably none, overflows the top of the plates 9, 27 and 33 to pass to the next tray below. In other words, the flow of liquid and gas to each tray is regulated and controlled so that a major portion of the liquid and the gas passes upwardly through the superposed bed of particulate solid and only a minor portion of the liquid by-passes the superposed bed of each tray.

From the foregoing description it is manifest that the present apparatus for primary countercurrent flow and secondary concurrent flow of liquid and gas comprises a vertical cylindrical tank (1), a vapor outlet (61) at the upper end of the tank, a liquid outlet (36) in the lower end of the tank, a plurality of supports (12) for gas and liquid mixing and distributing means (24, 25 and 32), each of said supports (12) being a segment of an annulus mounted in a horizontal plane on the inner periphery of said tank and first vertical plates (9, 27 and 33) each of said first vertical plates (9, for example) being generally opposite the neighboring first vertical plate (27, for example), said first vertical plates (9, 27 and 33) extending above said gas-liquid mixing and distributing means to provide with the walls of said tank and the lower portion of the next higher first vertical plates (16, 9 and 27) means for holding a pool of liquid and froth on said gas-liquid distributing means, the lowermost first vertical plate (33) extending to the region of the bottom of said tank, second vertical plates (58, 53 and 50) mounted parallel to each of said first vertical plates (9, 27 and 33) and between said first vertical plates and the wall of said tank and being secured along the vertical edges thereof to the inner periphery of said tank, all of said second vertical plates (58, 53 and 50) extending downwardly to have the lower edge thereof co-planar with the lower edge of the nearest first vertical plates (9, 27 and 33), bed supports (14) mounted on each of said second vertical plates, and on each of the opposite first vertical plates (16, 9 and 27) other than the lowermost (33), and shell (1) above the plane of the upper edge of the nearer first vertical plates (9, 27 and 33), a foraminous plate (11) mounted on said bed supports, means (20) for introducing material to be contacted in the upper portion of said tank between the wall thereof and first vertical plate (16) above the plane of the uppermost gas-liquid mixing and distributing means (24), means (37) for introducing gas to be contacted with said material into said tank located below the lowermost gas-liquid mixing and distributing means (32), and means to maintain a pool of contacted liquid in the bottom of said tank the surface of which is above the plane of the lower edge of said vertical plates (33 and 50).

In a simplified form of the extractor or reactor vertical plates 9, 27 and 33 together with downcomers 3, 28 and 34 are eliminated. Concomitant therewith mixing and distributing means 24, 25, and 32 are supported on support angles 12 which are secured in the simplified design to vertical plates 58, 53 and 50.

A tower of similar design can be used for catalytic reactions such as hydrocracking and hydrodesulfurization.

Figure 2 illustrates the use of a gas-liquid contact apparatus of the present invention for the catalytic hydrogenation of a mixture of hydrocarbons such as a distillate fuel oil fraction of petroleum oil to desulfurize said mixture of hydrocarbons and/or to hydrogenate constituents of said mixture.

Thus, a mixture of hydrocarbons to be treated in the presence of hydrogen, for example, a fraction of petroleum oil of the heating oil range boiling from about 400° F. to 650° F. is pumped from a source not shown through line 201 into absorption tower 202. Hydrogen sulfide-free product stripper off-gas (obtained as hereinafter described) flows through lines 272 and 203 into adsorption and stripping tower 202 in the region of the bottom thereof. The gas flows upwardly while the oil to be treated flows downwardly in tower 202. The intimate contact of the oil and gas results in the extraction of $C_4+$ hydrocarbons from the gas by the oil and in the stripping of water, oxygen and deposit producing materials from the oil by the gas. The off-gas flows from tower 202 via lines 204 and 256 to refinery fuel or further processing. The oil to be treated enriched with the hydrocarbons extracted from the gas and stripped of harmful agents leaves the tower by way of conduit 205. The enriched oil flows through conduit 205 to heat exchanger 206 where it is in heat exchange relation with the liquid effluent of hydrogenation tower 207.

The oil to be treated leaves heat exchanger 206 through pipe 208 and flows therethrough to coil 209 in furnace 210. The enriched oil to be treated is heated in coil 209 sufficiently to produce the desired reaction. For hydrodesulfurization of petroleum fractions such as heating oil, the reaction temperature will be of the order of 600° to 800° F. For hydrocracking, the reaction temperature will be of the order of 700° to 900° F. Those skilled in the art recognize that the reaction temperatures employed are dependent upon space velocity, temperature, pressure and the type or kind of catalytic material employed, the age of the catalytic material and generally the severity required to produce the desired results. The reaction pressure can range from atmospheric to 2500 p. s. i. g. or higher, depending upon the other conditions and the catalyst employed.

The heated oil flows through line 211 to line 212 and thence into reactor 207 of the same general design as that depicted in Figure 1. The heated oil flows downwardly in passage 213, horizontally in passage 214 and upwardly to the first trough 215 of mixing and distributing means 216. The flowing heated oil fills troughs 215 of tray 216 above which a foam or froth is created by the action of the hydrogen-rich gas passing therethrough and the excess, if any, flows over the upper edge of plate 217 and down through passage 218 to passage 219 and thence to troughs 220 of tray 221 while the major part of the heated oil, and preferably all, flows concurrently upward with the hydrogen-rich gas to and through the bed of catalyst thereabove. The primary and secondary flow of oil through reactor 207 is the same as described hereinbefore in the discussion of Figure 1.

Recycle gas produced in liquid-gas separator 238 flows through lines 241 and 242 to the high pressure hydrogen sulfide adsorption tower 245 and thence through lines 253 and 222 to heat exchanger 223. Hydrogen can be introduced into the recycle gas through line 273 under control of valve 274. When desirable, a portion of the recycle gas can be drawn-off to the refinery fuel system through lines 252 and 256. The hydrogen sulfide-free recycle gas and added hydrogen flow through line 222 to heat exchanger 223 where this gas is in heat exchange relation with the vaporous effluent from hot liquid-vapor separator 224 flowing to heat exchanger 223 through line 225.

The hydrogen-rich recycle gas flows from heat exchanger 223 through conduit 226 to heat exchanger 227 where said recycle gas can be passed in heat exchange relation with the vaporous effluent from reactor 207 flowing through line 228. The heated recycle gas flows from heat exchanger 227 through conduit 229 to line 230. All or part of the recycle gas can flow through line 230 directly to reactor 207 or all or part of said recycle gas can flow through line 231 to coil 232 in furnace 233 and thence through line 234 to line 230 and reactor 207. Election of the choice of routing the recycle gas in whole or in part through coil 232 is dependent upon the amount of heat to be transferred by the recycle gas to reactor 207, the amount of heat in the heat exchanged recycle gas in line 229 and the amount of heat in the heated oil in line 211 required to maintain the reaction temperature in reactor 207.

The primary and secondary flow of heated stripped recycle gas in reactor 207 is the same as that described in the discussion of Figure 1 hereinbefore.

From reactor 207 the treated oil in liquid phase flows therefrom through line 235 to heat exchanger 206 where it is in heat exchange relation with the oil to be treated. From heat exchanger 206 the treated liquid oil flows through conduit 236 to the hot liquid-vapor separator 224.

In the hot liquid-vapor separator 224 that portion of the reactor effluent in the vapor phase is withdrawn through line 225, heat exchanger 223, line 237, condenser 260, and line 261 to liquid-gas separator 238.

In liquid-gas separator 238 that portion of the vaporous portion of the effluent of reactor 207 in the liquid phase is withdrawn through line 239 to product stripper 240. The uncondensed portion of the contents of liquid-gas separator 238 is contaminated (hydrogen sulfide) recycle gas. The contaminated recycle gas flows from liquid-gas separator 238 through lines 241 and 242, to high pressure hydrogen sulfide absorber 245.

Returning to reactor 207 the vaporous contents of reactor 207 escape therefrom through line 243 and thence through line 228 to heat exchanger 227. From heat exchanger 227 the vapors flow through pipe 262 under control of valve 263 to line 237, through condenser 260 and line 261 to separator 238. Alternatively, with valve 263 closed the gaseous effluent of reactor 207 flows through line 228, heat exchanger 227 and line 264 under control of valve 265 to line 236 and thence through line 266 to hot liquid-vapor separator 224.

Another alternative is the direct commingling of the vaporous and heat exchanged liquid effluents from reactor 207 and introduction thereof directly into the hot liquid-vapor separator 224. Thus, the vaporous effluent flows from reactor 207 through lines 243 and 267 to line 266. The liquid effluent from reactor 207 flows through line 235 and exchanger 206, thence through line 236 to line 266 where it mixes with the vaporous effluent from line 267.

Returning to the hot liquid-vapor separator 224, the liquid portion of the liquid effluent or liquid and vaporous effluents from reactor 207 separates at substantially reaction pressure from the vaporous portion of the feed to separator 224. The liquid portion flows from separator 224 through line 246 to product stripper 240. The vaporous portion of the contents of separator 224 flows through line 225 to exchanger 223, line 237, condenser 260 and line 261 to liquid-gas separator 238 which operates at a temperature below that of the hot liquid-vapor separator 224.

In stripper 240 the treated oil flowing from the hot separator 224 through line 246 and from separator 238 through line 239 is stripped to specification by taking overhead residual hydrogen, hydrogen sulfide and hydrocarbons through line 247 to condenser 248. From condenser 248 the overhead flows through pipe 249 to accumulator 250. Condensate is withdrawn from accumulator 250 through line 251 for further processing or stabilizing, while the uncondensables flow through lines 244 and 257 to the fuel system, or through lines 244 and 268 to the low pressure hydrogen sulfide absorber 269 and thence to the oil feed absorber-stripper 202 through lines 272 and 203 and finally to fuel gas through lines 204 and 256.

In high pressure absorber 245 the hydrogen sulfide is removed by any suitable means such as an aqueous amine solution which flows to the absorber through line 275 from an amine stripper (not shown). The amine solution flows downwardly through absorber 245 contacting the gas flowing upwardly and removing the hydrogen sulfide therefrom. The amine solution fat with respect to hydrogen sulfide leaves absorber 245 through line 276 on its way to the amine stripper (not shown) mentioned hereinbefore where the hydrogen sulfide is stripped from the fat amine solution to provide the lean amine solution which returns to absorber 245 through line 275.

In low pressure absorber 269 the hydrogen sulfide is removed by any suitable means such as an aqueous amine solution which flows to the absorber through line 270 from an amine stripper (not shown). The amine solution flows downwardly through absorber 269 contacting the gas flowing upwardly and removing the hydrogen sulfide therefrom. The amine solution fat with respect to hydrogen sulfide leaves absorber 269 through line 271 through which it flows to an amine stripper (not shown) mentioned hereinbefore where the hydrogen sulfide is stripped from the fat amine solution to provide the lean amine solution which returns to absorber 269 through line 270.

Treated heating oil having an improved stability to storage with respect to color and the formation of sediment and having improved Diesel Index is withdrawn from stripper 240 through line 255 for blending, i. e., admixture with other components, or additives, for example, and/or storage.

The hydrogen-rich recycle gas entering the high pressure hydrogen sulfide absorber 245 through line 242 is stripped in said absorber of its hydrogen sulfide content to provide a recycle gas containing hydrogen and some hydrocarbons. When necessary or desirable a portion of this recycle gas can be bled from the system through line 252. The product stripper off-gas entering the low pressure hydrogen sulfide absorber 269 through lines 244 and 268 is stripped in said absorber of its hydrogen sulfide content. This gas stripped of hydrogen sulfide then flows to the feed stripper-absorber 202 as hereinbefore described through lines 272 and 202.

I claim:

1. A petroleum treating apparatus for contacting liquid petroleum components with a gaseous reagent wherein the primary flow of liquid and gas is countercurrent and the secondary flow of liquid and gas is concurrent, which comprises a vertical cylindrical closed tank, means disposed in the upper portion of said tank for introducing fluid material including at least some liquid phase material thereinto, means disposed in the upper portion of said tank for removing gas therefrom, means disposed in the lower portion of said tank for removing treated liquid, means disposed in the lower portion of said tank for introducing gas thereinto, means defining a plurality of vertically spaced apart liquid-gas contacting chambers horizontally disposed in said tank between the aforesaid inlets and outlets, each of said contacting chambers comprising a liquid-gas mixing and distributing means comprising a tray horizontally disposed at the bottom of the contacting chamber and adapted to maintain a pool or pools of liquid thereon, a bed of particulate solid horizontally disposed and vertically spaced upwardly from said liquid-gas mixing and distributing means, means defining a froth chamber between said liquid-gas mixing and distributing means and said bed of particulate solid enveloping at least the bottom of said bed of particulate solid, and means defining a gas disengaging chamber above the bed of particulate solid, the gas disengaging chamber in each contacting chamber other than the top contacting chamber being in unrestricted communication with the liquid-gas mixing and distributing means in the next higher contacting chamber, the gas disengaging chamber in the top contacting chamber being in unrestricted communication with said gas outlet, means in each contacting chamber other than the lowest to conduct liquid from the top of the bed of particulate solid therein to the gas-liquid mixing and distributing means of the next lower contacting chamber, said last-mentioned means including a vertical downwardly extending dam to create a gas seal, means in each contacting chamber other than the lowest to conduct any liquid overflowing the liquid-gas mixing and distributing means therein to the gas-liquid mixing and distributing means in the next lower contacting chamber, means in the lowest contacting chamber to conduct liquid from the top of the bed of particulate solid therein to the bottom of said tank, said last-mentioned means including a vertical downwardly extending dam to create a gas seal, means in the lowest contacting chamber to conduct any liquid overflowing the liquid-gas mixing and distributing means therein to the bottom of said tank, and means to maintain a pool of liquid in said tank forming a gas seal with said means in the lowest contacting chamber for conducting liquid to the bottom of said tank.

2. The apparatus of claim 1 wherein at least one contacting chamber other than the top contacting chamber is provided in the region of the inlet to the gas-liquid mixing and distributing means therein with means for withdrawing liquid, means for contacting withdrawn liquid with a heat transfer medium external of said tank, and means for returning said heat-exchanged withdrawn liquid to the liquid-gas mixing and distributing means in the chamber from which the liquid was withdrawn.

3. A petroleum treating apparatus for contacting petroleum components with a gaseous reagent with primary countercurrent flow and secondary concurrent flow of liquid and gas, comprising a vertical cylindrical tank, a vapor outlet in the upper portion of said tank, an inlet for fluid material including at least some liquid phase material in the upper portion of said tank, a treated liquid outlet in the lower portion of said tank, a gas inlet in the lower portion of said tank in a horizontal plane above that of said liquid outlet, means defining a series of similar gas and liquid mixing and distributing means each comprising a tray disposed in vertically spaced relationship to one another in said tank between the aforesaid inlets and outlets, each of said gas and liquid mixing and distributing means being mounted on a support member in a horizontal plane, each of said support members being mounted on the inner periphery of said tank and upon a vertical support plate secured to the wall of said tank, each of said vertical support plates being substantially opposite similar vertical support plates supporting the adjacent mixing and distributing means and each vertical support plate extending above the associated mixing and distributing means to provide with the walls of said tank and the lower portion of the next higher vertical supporting plate a means for holding a pool of liquid and froth on said associated mixing and distributing means, and each of said vertical support plates extending below the associated gas and liquid mixing and distributing means to form a gas seal with the next lower mixing and distributing means, the lowermost of said vertical support plates extending to the region of the bottom of said tank, a vertical baffle secured to the walls of said tank opposite the uppermost of said vertical support plates between said fluid material inlet and the uppermost mixing and distributing means, a second vertical plate mounted parallel to each of the aforesaid vertical support plates between the vertical support plate and the wall of said tank and being secured to the inner periphery of said tank, all of said second vertical plates extending downwardly to have the lower edges thereof substantially co-planar with the lower edge of the nearest vertical support plate and below the plane of the adjacent mixing and distributing means a distance sufficient to provide a gas seal, a bed support mounted on each of said second vertical plates above the plane of the upper edge of the nearer vertical support plate, a bed support mounted on said vertical baffle and on each of said vertical support plates other than the lowermost and on the wall of said tank horizontally co-planar with the bed support mounted on said second vertical plates, a foraminous plate mounted on said bed supports and having disposed thereon a bed of particulate solid, and means in said outlet for treated liquid to maintain a pool of liquid in the bottom of said tank the surface of which at least contacts the lower edges of the lowermost of said vertical support plates and said second vertical plates in order to form a gas seal.

4. A petroleum treating apparatus for contacting petroleum components with a gaseous reagent with primary countercurrent flow and secondary concurrent flow of liquid and gas, comprising a vertical cylindrical closed tank, a vapor outlet in the upper portion of said tank, an inlet for fluid material including at least some liquid phase material in the upper portion of said tank, a treated liquid outlet in the lower portion of said tank, a gas inlet in the lower portion of said tank above the level of said treated liquid outlet, a plurality of opposing first vertical plates, the upper edge of the uppermost of said first vertical plates being above said fluid material inlet and the lower edge thereof being below said fluid material inlet and below the upper edge of the next lower of said first vertical plates, a support member mounted in a substantially horizontal plane on each of said first vertical plates, other than the uppermost, and the wall of said tank, a distance below the upper edge of each of said first vertical plates greater than the height of a gas-liquid mixing and distributing means to be mounted thereon, a gas-liquid mixing and distributing means comprising a tray mounted on said support member, the lower portion of the upper of two opposing first vertical plates and the portion of the lower of said two opposing first vertical plates below the gas-liquid mixing and distributing means mounted thereon with the walls of said tank forming the walls of a liquid pool chamber on said mixing and distributing means and a froth chamber contiguous to and extending upwardly from said liquid pool chamber, a plurality of second vertical plates, each of said second vertical plates being mounted on the wall of said tank between one of said first vertical plates and the wall of said tank and substantially parallel to the first vertical plate, the lower edge of said second vertical plate being substantially coplanar with the lower edge of the adjacent first vertical plate and with said first vertical plate forming a gas seal for the next lower liquid pool chamber and froth chamber, the lowermost of the plurality of said first and second vertical plates extending below the said gas inlet, a bed support mounted on each of said second vertical plates below the upper edge thereof and above the upper edge of the adjacent first vertical plate, on the wall of said tank, and on the horizontally distant first vertical plate in a substantially horizontal plane within the froth chamber, a foraminous plate mounted on each of said bed supports, the portion of said second vertical plate and the walls of said tank and said foraminous plate forming a container for a bed of particulate solid having at least the bottom thereof in the froth chamber, each of said second vertical plates with the wall of said tank forming a conduit for the flow of liquid from the top of the support bed of particulate solid and each of said first vertical plates with the adjacent second vertical plate forming a conduit for flow of any liquid overflowing the supported gas-liquid mixing and distributing means.

5. The apparatus of claim 4 wherein the gas-liquid mixing and distributing means comprises a plurality of trough-like members extending transversely across the tank and a plurality of slotted elements affixed to either end of said members, adjacent members being interlocked one into the other by engagement of the slot edges of said elements affixed to either end of each member with the trough edge of an adjoining member.

6. The apparatus of claim 4 wherein means is provided for withdrawing liquid from at least one of said gas-liquid mixing and distributing means, heat exchanging said withdrawn liquid with an extraneous heat transfer medium, and returning said heat-exchanged liquid to the same gas-liquid mixing and distributing means.

7. A petroleum treating apparatus for contacting liquid petroleum components with a gaseous reagent wherein the primary flow of liquid and gas is countercurrent and the secondary flow of liquid and gas is concurrent which comprises a vertical cylindrical closed tank, means disposed in the upper portion of said tank for introducing fluid material including at least some liquid phase material thereinto, means disposed in the upper portion of said tank for removing gas therefrom, means disposed in the lower portion of said tank for removing treated liquid, means disposed in the lower portion of said tank for introducing gas thereinto, means defining a plurality of vertically spaced apart liquid-gas contacting chambers horizontally disposed in said tank between the aforesaid inlets and outlets, each of said contacting chambers comprising a liquid-gas mixing and distributing means comprising a tray horizontally disposed at the bottom of the contacting chamber and adapted to maintain a pool or pools of liquid thereon, a bed of particulate solid horizontally disposed and vertically spaced upwardly from said liquid-gas mixing and distributing means, means defining a froth chamber between said liquid-gas mixing and distributing means and said bed of particulate solid enveloping at least the bottom of said bed of particulate solid, and means defining a gas disengaging chamber above the bed of particulate solid, the gas disengaging chamber in each contacting chamber other than the top contacting chamber being in unrestricted communication with the liquid-gas mixing and distributing means in the next higher contacting chamber, the gas disengaging chamber in the top contacting chamber being in unrestricted communication with said gas outlet, means in each contacting chamber other than the lowest to conduct liquid from the top of the bed of particulate solid therein to the gas-liquid mixing and distributing means of the next lower contacting chamber, said last-mentioned means including a vertical downwardly extending dam to create a gas seal, means in the lowest contacting chamber to conduct liquid from the top of the bed of particulate solid therein to the bottom of said tank, said last-mentioned means including a vertical downwardly extending dam to create a gas seal, and means to maintain a pool of liquid in said tank forming a gas seal with said means in the lowest contacting chamber for conducting liquid to the bottom of said tank.

References Cited in the file of this patent

UNITED STATES PATENTS

| | | |
|---|---|---|
| 1,908,599 | Gray | May 9, 1933 |
| 1,944,877 | Darlington | Jan. 30, 1934 |
| 1,962,153 | Peterkin | June 12, 1934 |
| 2,072,382 | Robinson | Mar. 2, 1937 |
| 2,337,419 | Sensel | Dec. 21, 1943 |
| 2,451,433 | Davis | Oct. 12, 1948 |
| 2,520,391 | Findlay | Aug. 29, 1950 |
| 2,587,149 | Gwynn | Feb. 26, 1952 |
| 2,707,163 | Thibault | Apr. 26, 1955 |
| 2,762,683 | Massey | Sept. 11, 1956 |